(12) United States Patent
Oram et al.

(10) Patent No.: US 10,634,194 B2
(45) Date of Patent: Apr. 28, 2020

(54) RETAINER FOR INNER AND OUTER SHAFTS

(71) Applicant: GKN Driveline North America, Inc., Auburn Hills, MI (US)

(72) Inventors: Samuel J. Oram, Tochigi (JP); Crittenden A. Bittick, Rochester Hills, MI (US); Tony N. Arden, Davisburg, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 719 days.

(21) Appl. No.: 15/320,918

(22) PCT Filed: Jun. 25, 2015

(86) PCT No.: PCT/US2015/037672
§ 371 (c)(1),
(2) Date: Dec. 21, 2016

(87) PCT Pub. No.: WO2015/200623
PCT Pub. Date: Dec. 30, 2015

(65) Prior Publication Data
US 2017/0130777 A1    May 11, 2017

Related U.S. Application Data

(60) Provisional application No. 62/016,935, filed on Jun. 25, 2014.

(51) Int. Cl.
*F16D 1/116*    (2006.01)
*F16B 21/18*    (2006.01)

(52) U.S. Cl.
CPC ............ *F16D 1/116* (2013.01); *F16B 21/186* (2013.01)

(58) Field of Classification Search
CPC ........ F16B 21/16; F16B 21/18; F16B 21/183; F16B 2/20; F16B 2/22; F16B 2/24;
(Continued)

(56) References Cited

U.S. PATENT DOCUMENTS

RE18,144 E    8/1931  Heiermann
2,580,396 A    1/1952  Bluth
(Continued)

FOREIGN PATENT DOCUMENTS

CA    1271346 A    7/1990
CN    1833112 A    9/2006
(Continued)

OTHER PUBLICATIONS

Written Opinion & International Search Report for PCT/US2015/037672 dated Sep. 16, 2015, 9 pages.
(Continued)

*Primary Examiner* — Jonathan P Masinick
(74) *Attorney, Agent, or Firm* — Jennifer M. Brumbaugh; Reising Ethington P.C.

(57) ABSTRACT

In at least some implementations, a clip for restricting the axial movement of at least one of an inner shaft or an outer shaft relative to the other shaft includes a first free end, a second free end, an opening defining an open end of the clip between the first free end and the second free end, a closed end opposite the open end, at least three control zones, and a plurality of intermediate zones. Each intermediate zone has a varying width and each is disposed adjacent to at least one of the at least three control zones.

18 Claims, 6 Drawing Sheets

(58) Field of Classification Search
CPC .......... F16B 2/241; F16B 2/245; F16D 1/116; F16D 2001/103; Y10T 403/559
See application file for complete search history.

(56) References Cited

U.S. PATENT DOCUMENTS

| | | | | |
|---|---|---|---|---|
| 2,595,787 | A * | 5/1952 | Heimann | ................ F16B 21/18 24/16 R |
| 3,431,809 | A | 3/1969 | Frailly | |
| 3,595,123 | A | 7/1971 | Wurzel | |
| 3,987,697 | A | 10/1976 | Wurzel | |
| 4,113,397 | A | 9/1978 | Snyder | |
| 4,183,280 | A | 1/1980 | Hashimoto | |
| 4,343,581 | A | 8/1982 | Millheiser | |
| 4,828,300 | A | 5/1989 | Agbay | |
| 5,383,938 | A | 1/1995 | Rohr et al. | |
| 6,113,306 | A | 9/2000 | Allert | |
| D487,390 | S | 3/2004 | Tanaka et al. | |
| 7,112,905 | B2 * | 9/2006 | Chang | ................... F04D 19/007 310/112 |
| D540,153 | S | 4/2007 | Tanaka et al. | |
| 8,747,014 | B2 | 6/2014 | Raszkowski et al. | |
| 9,068,473 | B2 * | 6/2015 | House | ..................... F01D 25/16 |
| 9,303,664 | B2 * | 4/2016 | Keech | ....................... F16B 5/02 |
| 2004/0247383 | A1 | 12/2004 | Chang et al. | |
| 2005/0214101 | A1 | 9/2005 | Dexter et al. | |
| 2006/0257228 | A1 | 11/2006 | Jacob | |
| 2007/0104552 | A1 * | 5/2007 | Hewgill | ................ F16B 21/183 411/145 |
| 2007/0107166 | A1 * | 5/2007 | Kastner | .................. F16B 21/18 24/16 R |
| 2014/0116184 | A1 * | 5/2014 | Clark | ...................... F16D 1/108 74/492 |

FOREIGN PATENT DOCUMENTS

| | | | |
|---|---|---|---|
| CN | 202118061 U | 1/2012 | |
| DE | 19755845 C1 | 3/1999 | |
| FR | 2674299 A1 * | 9/1992 | ............ F16B 21/183 |
| GB | 799155 A | 8/1958 | |
| GB | 847874 A | 9/1960 | |
| JP | S51129947 U | 10/1976 | |
| JP | S5477849 A | 6/1979 | |
| JP | S6324419 U | 2/1988 | |
| JP | H0289816 A | 3/1990 | |
| JP | H0594521 U | 12/1993 | |
| JP | 2004324828 A | 11/2004 | |
| JP | 2006242238 A | 9/2006 | |
| JP | 2010286007 A | 12/2010 | |
| WO | WO2004088152 A1 | 10/2004 | |
| WO | WO2010080807 A1 | 7/2010 | |

OTHER PUBLICATIONS

CN Office Action for CN Application No. 201580034214.3 dated Mar. 30, 2018 (14 pages).
CN Office Action for CN Application No. 201580034214.3 dated Dec. 3, 2018 (5 pages).
EP Office Action for EP Application No. 15811621.0 dated Oct. 15, 2018 (6 pages).
EP Extended Search Report for EP Application No. 15811621.0 dated Feb. 6, 2018 (8 pages).
CN Office Action for CN Application No. 201580034214.3 dated Jun. 13, 2019 (20 pages).
JP Office Action for JP Application No. 2016-574380 dated Mar. 26, 2019 (5 pages).

* cited by examiner

RETAINER FOR INNER AND OUTER SHAFTS

REFERENCE TO COPENDING APPLICATIONS

This application claims the benefit of U.S. Provisional Patent Application Ser. No. 62/016,935 filed Jun. 25, 2014, which is incorporated herein by reference in its entirety.

TECHNICAL FIELD

The present disclosure is generally related to a retainer for use with inner and outer shafts, and more particularly, to a clip that restricts axial movement of at least one of the shafts relative to the other.

BACKGROUND

In general, vehicle drivelines transmit torque from a vehicle's engine to its wheels. Automotive drivelines sometimes include power transfer units (PTUs, also known as power take-off units) for selectively distributing torque among shafts in the drivelines. A PTU typically consists of a housing that encloses and supports gears, shafts, and bearings. Two shafts of the PTU may need to be coupled together and the relative axial movement of the shafts constrained by a coupler. Packaging in automotive drivelines, as elsewhere in automobiles, often demands inflexible size constraints which can frustrate or prevent installation of the shafts and any coupler on the shafts, or require a coupler of a size and shape that may be damaged (e.g. plastically deformed or broken) during installation.

SUMMARY

In at least some implementations, a clip for restricting the axial movement of at least one of an inner shaft or an outer shaft relative to the other shaft includes a first free end, a second free end, an opening defining an open end of the clip between the first free end and the second free end, a closed end opposite the open end, at least three control zones, and a plurality of intermediate zones. Each intermediate zone has a varying width and each is disposed adjacent to at least one of the at least three control zones.

In at least some implementations, a first control zone is located in the closed end of the clip, a second control zone is located between the first control zone and the first free end, and a third control zone is located between the first control zone and the second free end. Further, a first intermediate zone is disposed between the first and second control zones, and as it extends between the first and second control zones, the width thereof increases and then decreases. A second intermediate zone is disposed between the first and third control zones, and as it extends between the first and third control zones, the width thereof increases and then decreases. In at least some implementations, the widths of the first and second intermediate zones increase from the width of the first control zone and then decrease to the width of the second or third control zone, respectively. In at least some implementations, the width of the first control zone is the same as the width of the second control zone, the third control zone, or both. In at least some implementations, the width of first control zone is different than the width of the second control zone, the third control zone, or both. And the widths of the second and third control zones may be within 10% of the width of the first control zone.

In at least some implementations, a third intermediate zone is disposed between the second control zone and the first free end, and a fourth intermediate zone is disposed between the third control zone and the second free end. The width of the third intermediate zone may decrease as it extends from the second control zone to the first free and, and the width of the fourth intermediate zone may decrease as it extends from the third control zone to the second free end.

In at least some implementations, the first control zone is disposed within a first vertical plane that includes a centerline of the clip extending through the closed end and the center of the open end, and at least one of the second or third control zones is disposed within a predetermined angular range of a second plane that is orthogonal to the first vertical plane. The second plane may include a centerline of the clip that is orthogonal to the centerline extending through the closed end and the center of the open end.

In at least some implementations, the clip is generally elliptical in shape. The opening at the open end of the clip may have a width that increases as it extends radially inward. In at least some implementations, an inner peripheral surface of the clip may have portions that define a circle, wherein the opening at the open end of the clip has a width that is 45-65% of the diameter of the circle.

In at least some implementations, an assembly includes an inner shaft, an outer shaft, a clip and a bore within which the inner shaft, outer shaft, and clip are disposed, the bore including a raised portion therein such that at least a portion thereof has a non-circular cross-sectional shape. The inner shaft defines a longitudinal axis and has a groove formed in an outer surface thereof. The outer shaft has an axially facing surface relative to the longitudinal axis. The clip may be elastically deformable and have an open end with an opening and a closed end opposite the open end. When the clip is assembled with the inner and outer shaft, respective portions of the clip are seated within the groove of the inner shaft and engage the axially-facing surface of the outer shaft, and the clip is operative to restrict axial movement of at least one of the inner or outer shafts relative to each other, and the clip is configured to be elastically deformed to pass over the raised portion in the bore during the assembly of the clip with the inner and outer shafts without yielding.

In at least some implementations, the clip includes at least three control zones, and a plurality of intermediate zones each having a varying width, and each being disposed adjacent to at least one of the at least three control zones. A first control zone is located in the closed end of the clip, a second control zone is located between the first control zone and the first free end, and a third control zone is located between the first control zone and the second free end. A first intermediate zone is disposed between the first and second control zones, and as it extends between the first and second control zones, the width thereof increases and then decreases. A second intermediate zone is disposed between the first and third control zones, and as it extends between the first and third control zones, the width thereof increases and then decreases.

In at least some implementations, the widths of the first and second intermediate zones increase from the width of the first control zone and then decrease to the width of the second or third control zone, respectively. The width of the first control zone may be the same as the width of the second control zone, the third control zone, or both. And the width of first control zone may be different than the width of the second control zone, the third control zone, or both.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Figure 1:
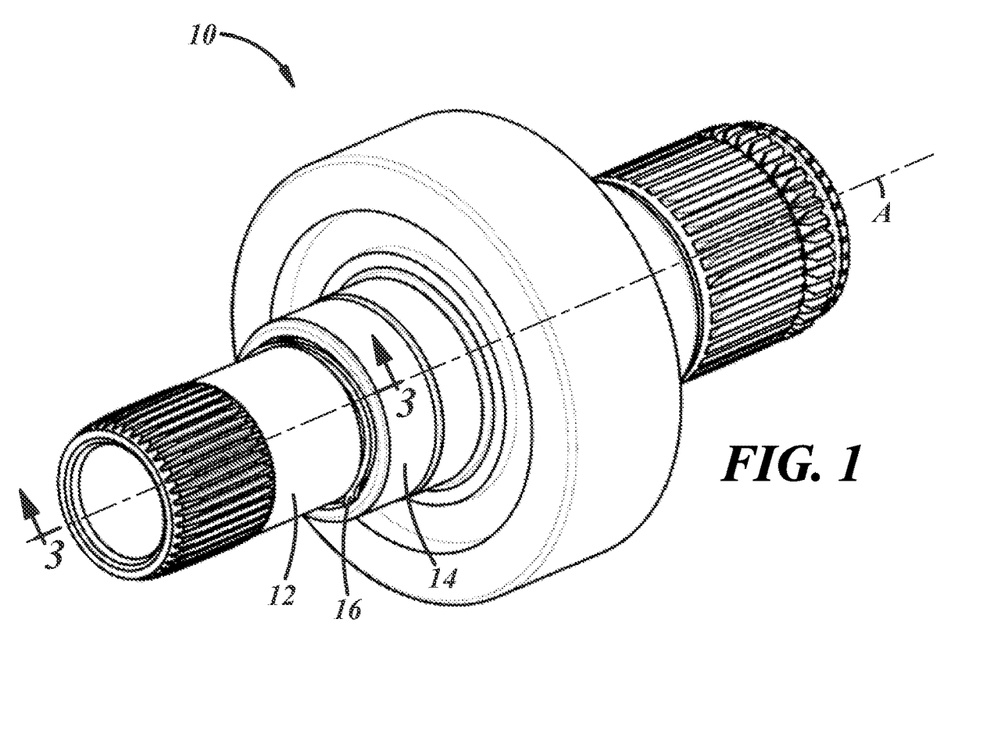
FIG. 1 is an isometric view of an assembly comprising an inner shaft, an outer shaft, and a clip configured to restrict axial movement of at least one of the inner or outer shafts relative to the other.
Figure 2:
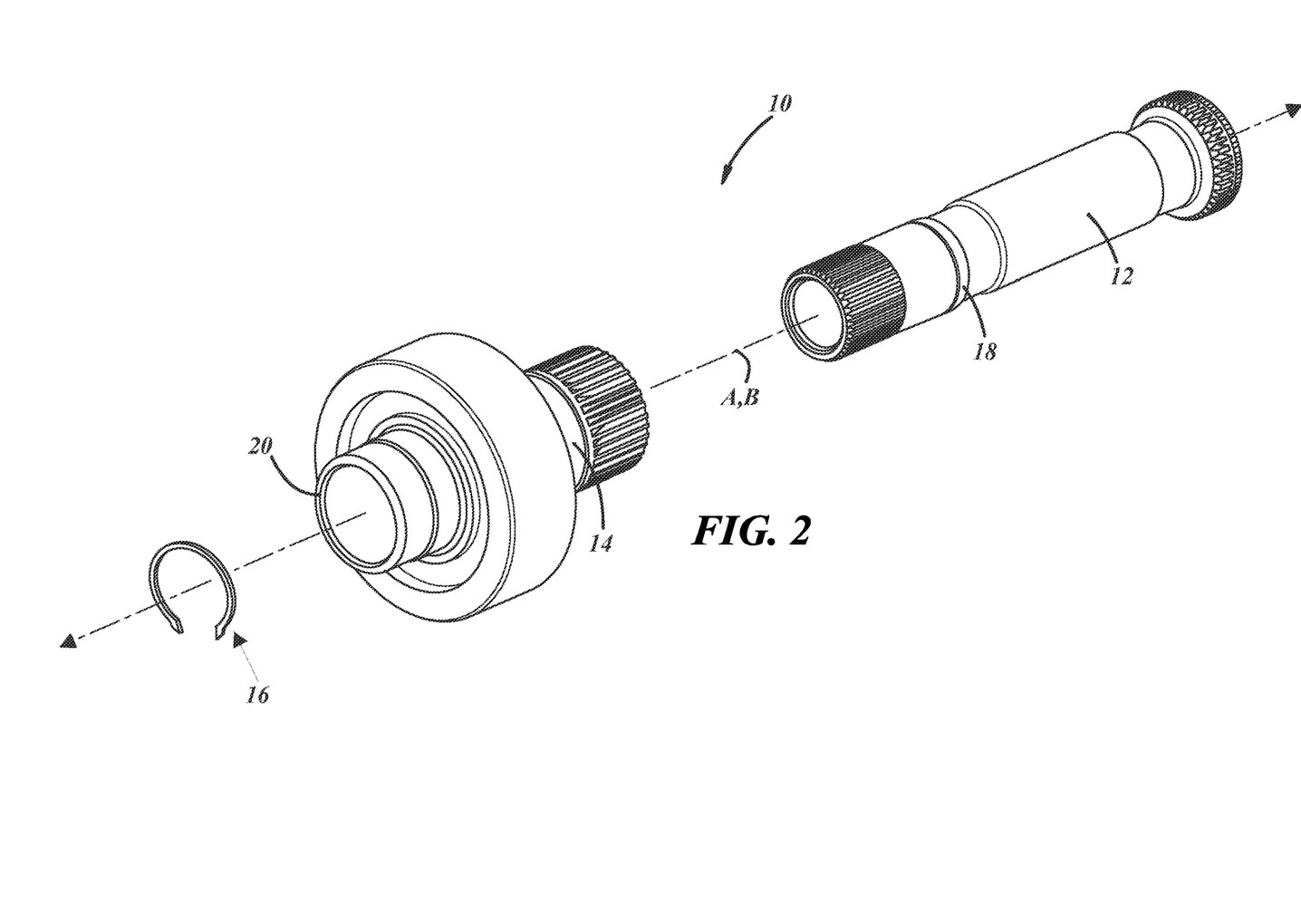
FIG. 2 is an exploded view of the assembly illustrated in FIG. 1.

FIGS. 1 and 2 depict an illustrative embodiment of an assembly 10 that comprises, at least in part, an inner shaft 12, an outer shaft 14, and a retainer, which is shown as an elastically deformable clip 16 (commonly referred to as, for example, a "circlip" or "snap ring") that when assembled with the inner and outer shafts 12, 14 is operative to restrict (i.e., prevent or limit) the axial movement of at least one of the inner or outer shafts 12, 14 relative to the other along a longitudinal axis A. In the embodiment illustrated in FIGS. 2 and 3, the inner shaft 12 includes a radially-outwardly facing groove 18 that may extend completely circumferentially about the inner shaft 12 and is configured to receive and have seated therein at least certain portions of the clip 16. When the inner and outer shafts 12, 14 are assembled together and the clip 16 is assembled with the inner shaft 12 (i.e., seated within the groove 18 thereof), the clip 16 abuts an axially-facing surface 20 of the outer shaft 14, and therefore, restricts the axial movement of at least one of the shafts 12, 14 relative to the other, and in at least some implementations, may do so without impeding the rotation of either inner shaft 12 or outer shaft 14. More particularly, as shown in FIG. 3, the clip 16 is operative to prevent the movement of the outer shaft 14 along the axis A in a direction 21, and may also prevent movement of the inner shaft 12 along with the axis A in a direction 22 opposite the direction 21, in applications where both shafts move axially.

Figure 3:
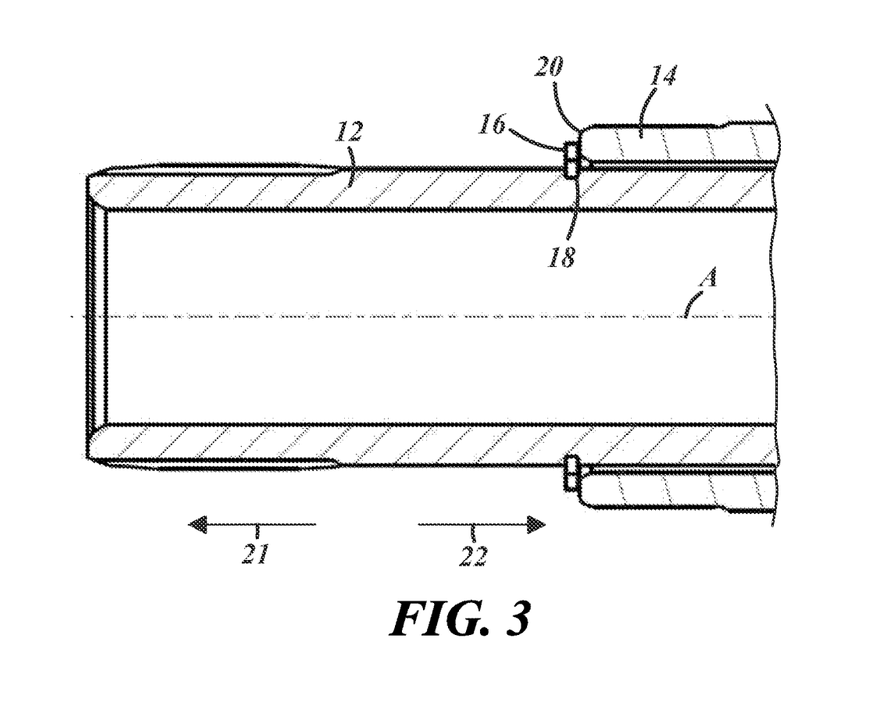
FIG. 3 is a cross-sectional view of a portion of the assembly illustrated in FIG. 1 taken along the line 3-3 in FIG. 1.
Figure 4:
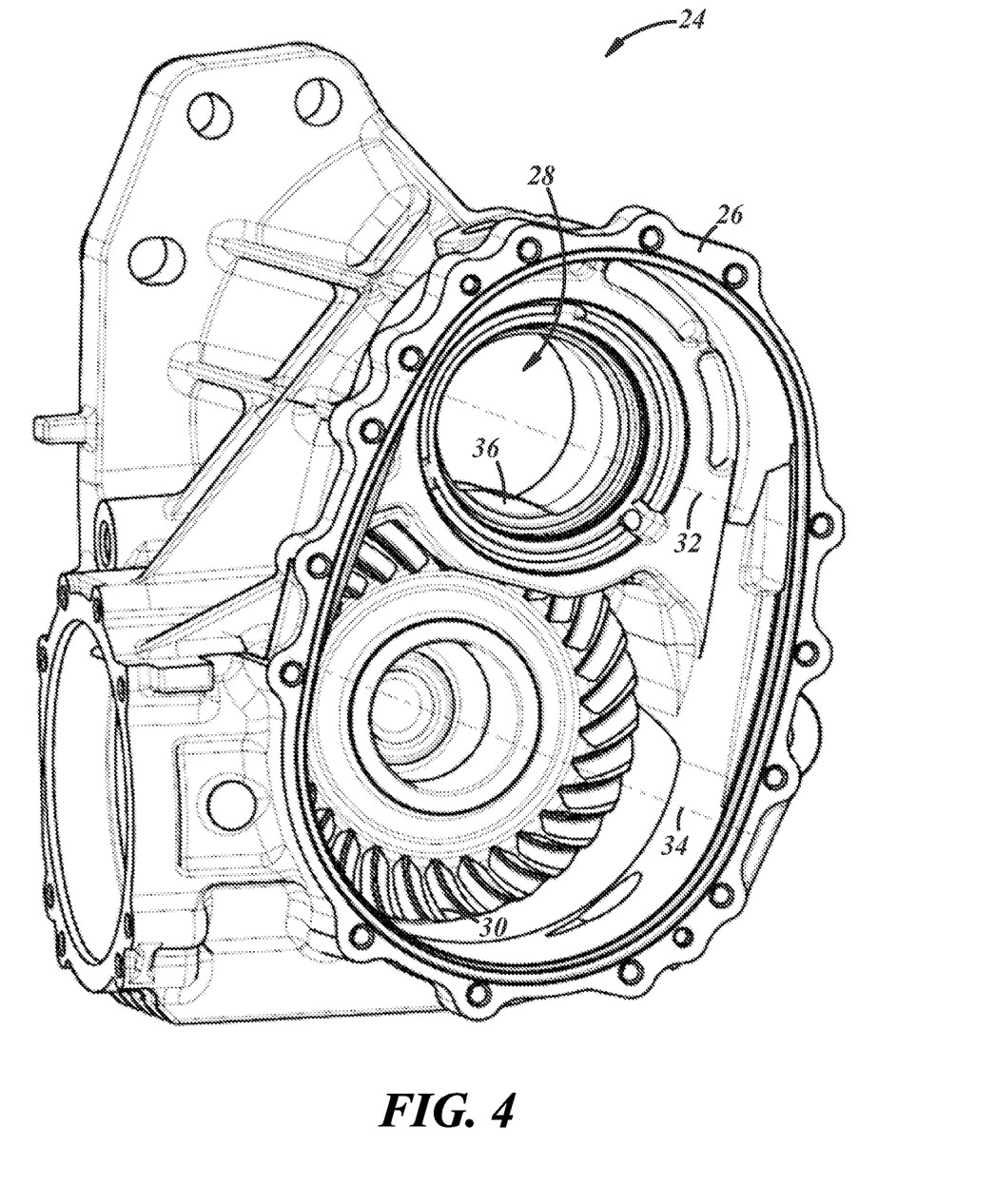
FIG. 4 is an isometric view of an illustrative embodiment of a power transfer unit (PTU) in which the assembly illustrated in FIG. 1 may be implemented.
Figure 5:
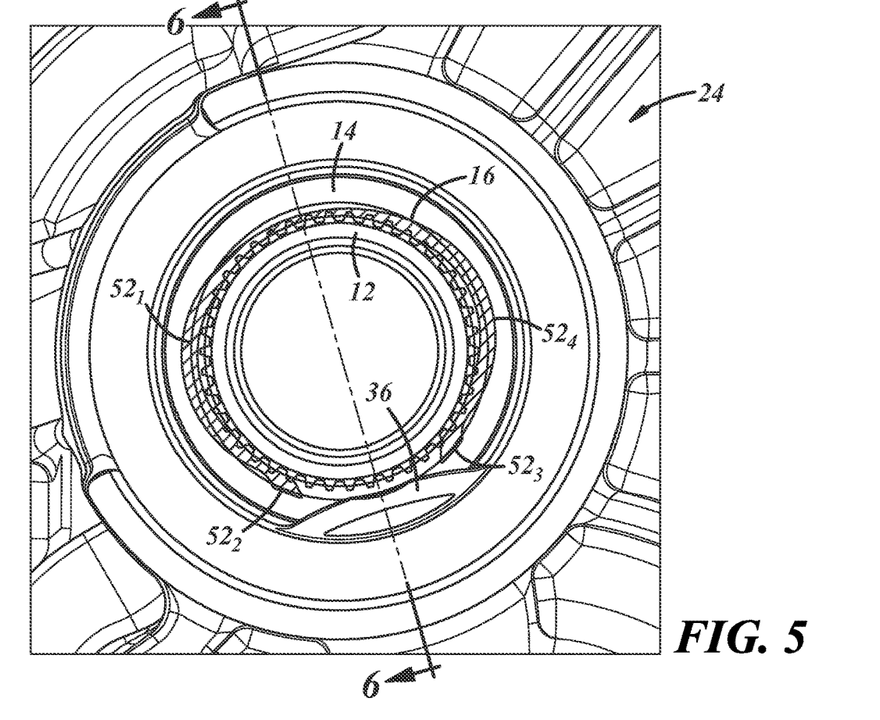
FIG. 5 is an enlarged elevational view of an input shaft bore of the PTU illustrated in FIG. 4, wherein the assembly illustrated in FIG. 1 is disposed within the input shaft bore, and the clip is shown with cross-hatching for ease of viewing.
Figure 6:
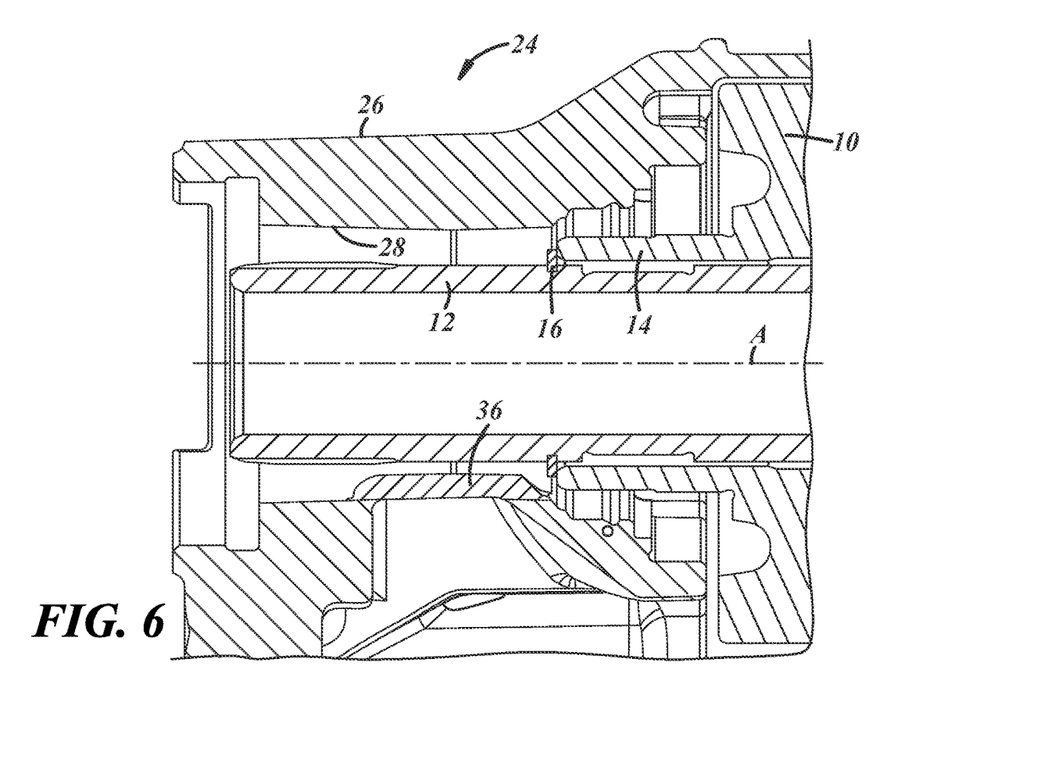
FIG. 6 is a cross-sectional view of a portion of the PTU illustrated in FIGS. 4 and 5 taken along the line 6-6 in FIG. 5.

It will be appreciated by one having ordinary skill in the art that assemblies such as that illustrated in FIGS. 1-3 may be implemented or integrated in any number of applications including, for example and without limitation, a larger assembly such as a power transfer unit (PTU) or a constant velocity joint (CVJ) of automotive drivelines. For example, FIG. 4 depicts a portion of an illustrative embodiment of a PTU 24 having, among other components and features, a housing 26, an input shaft bore 28, and a ring gear 30. As illustrated in FIGS. 5 and 6, the assembly 10 is configured to be inserted into and disposed within the input shaft bore 28. As illustrated in FIGS. 4-6, due to the offset between a centerline 32 of the input shaft bore 28 and a centerline 34 of the ring gear 30 that results from packaging constraints attendant in PTUs, in this particular implementation the input shaft bore 30 includes a bump or raised portion 36 that provides clearance for the ring gear 30 to rotate freely or for a gear mated with the ring gear to rotate or move relative to the ring gear.

Figure 7:
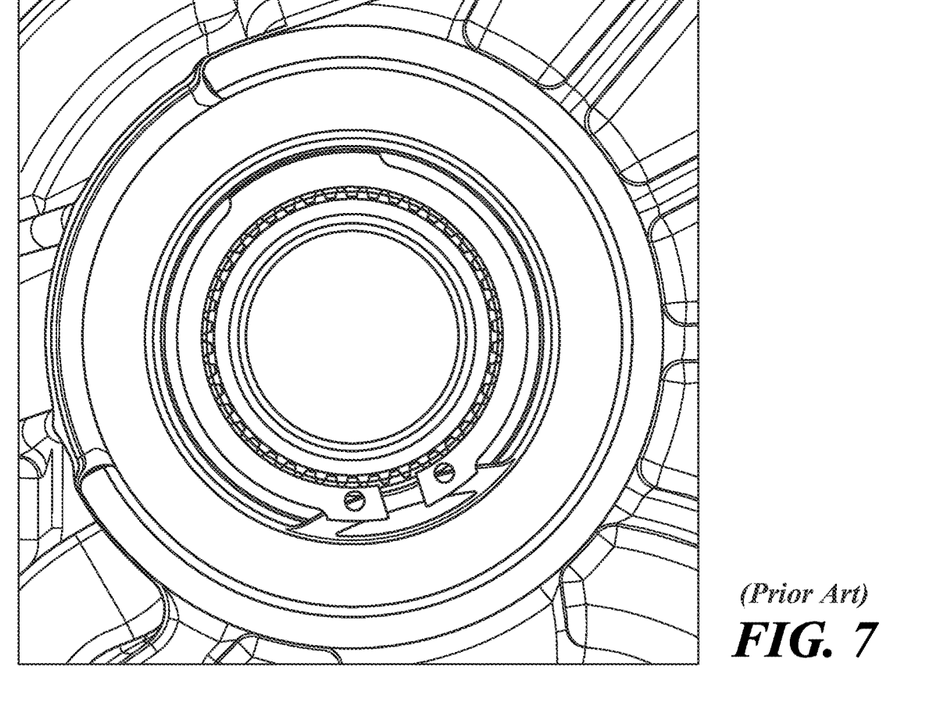
FIG. 7 is an enlarged elevational view of the input shaft bore of the PTU illustrated in FIG. 4, wherein a prior art clip is illustrated along with a portion of the assembly illustrated in FIG. 1.

During assembly of the PTU 24, the outer shaft 14 is assembled with the housing 26, and more particularly, is inserted into the bore 28 in the housing 26. Once the outer shaft 14 is appropriately located in the housing 26, the inner shaft 12 is inserted into the bore 28 through the outer shaft along axis A. Once the inner and outer shafts 12, 14 are appropriately located, the clip 16 is inserted into the bore 28, passed over the inner shaft 12, and then seated in the groove 18 in inner shaft 12. However, in an embodiment such as that depicted in FIGS. 4-6 wherein the bore 28 includes the bump 36, the bump 36 may present challenges to the installation of the clip 16. For example and with reference to FIG. 7, the open end of conventional clips is not wide enough when the clip is in a relaxed state (i.e., the clip is neither compressed nor expanded) to clear the bump during installation. And when such clips are expanded to sufficiently widen the opening, the clip may plastically deform, become weakened or yield (e.g., bend without springing back into, for example, the groove in the inner shaft). In at least some applications, this may be undesirable or completely unsuitable.

Figure 8:
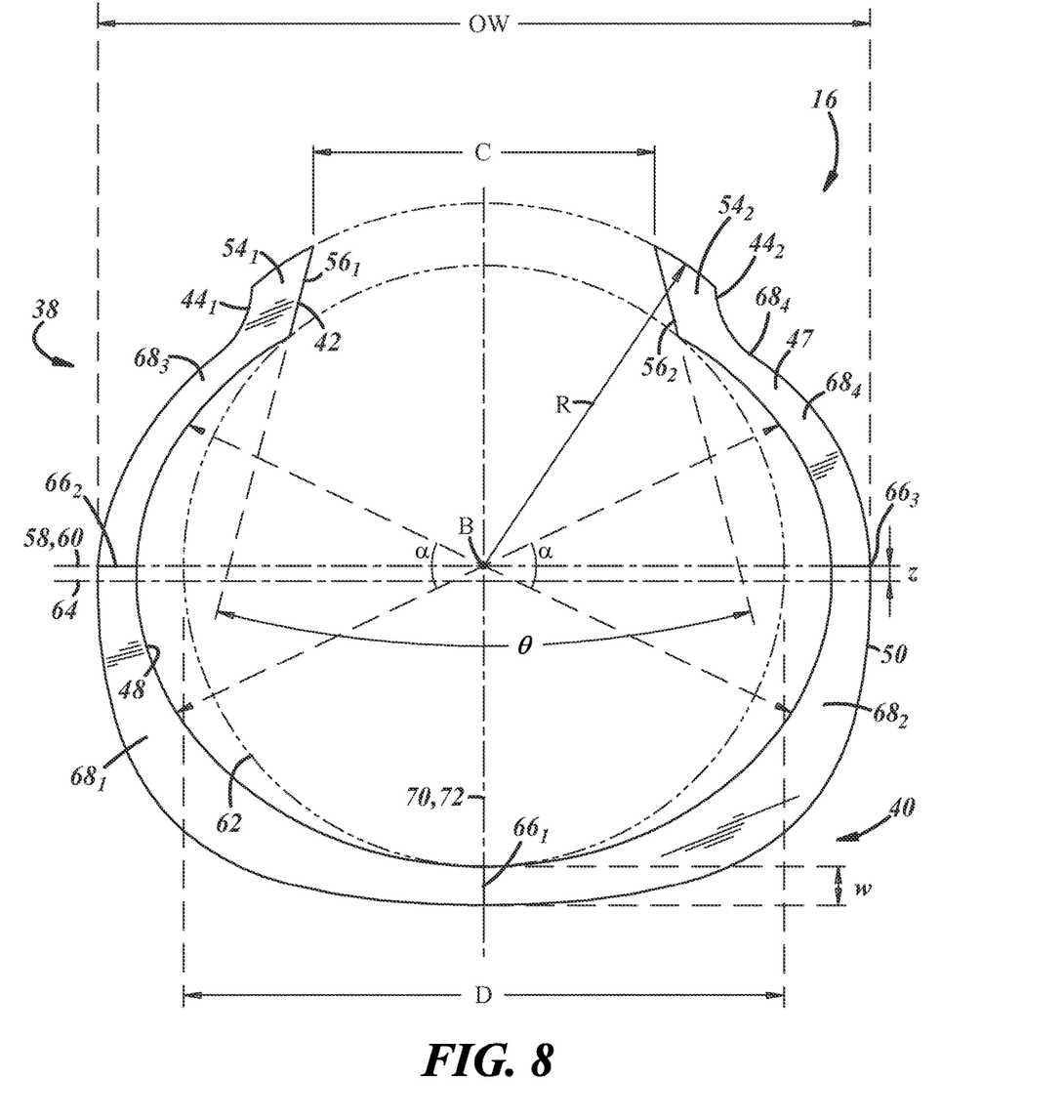
FIG. 8 is an exaggerated view of an illustrative embodiment of the clip of the assembly illustrated in, for example, FIGS. 1 and 2.
Figure 9:
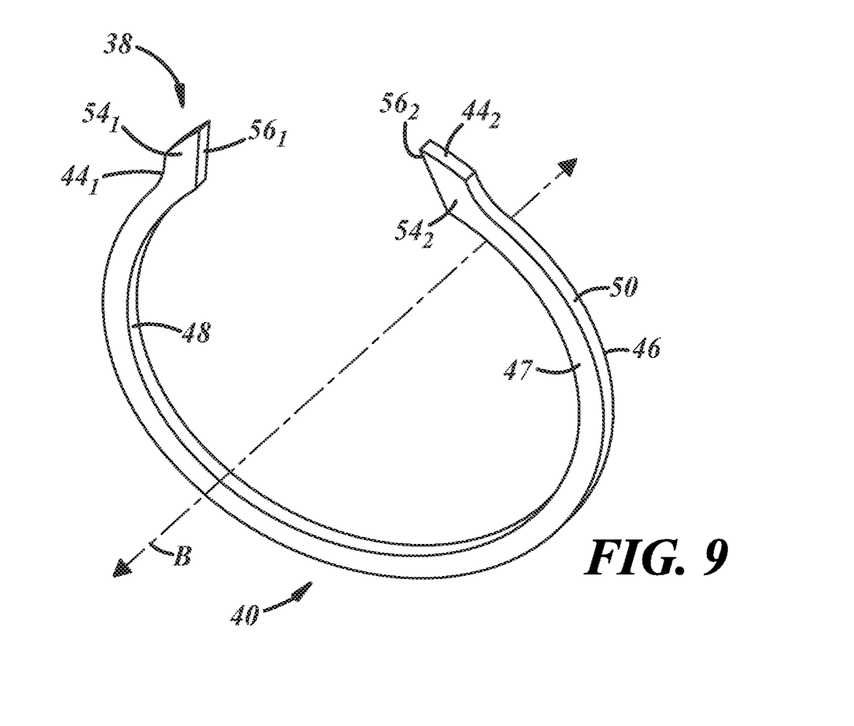
FIG. 9 is a isometric view of the clip illustrated in FIG. 8.

In the illustrative embodiment shown in FIGS. 8 and 9, the clip 16 is generally C-shaped and has an open end 38 and a closed end 40 opposite the open end 38, and may define or include an axis B extending through the center thereof that, as illustrated in FIG. 2, may be coincident with the axis A when the clip 16 is assembled with the inner and outer shafts 12, 14. The open end 38 includes an opening 42 between a pair of free ends $44_1$, $44_2$ of the clip 16, and that is relatively wide as compared to, for example, the opening of the conventional clip depicted in FIG. 7. The clip 16 further includes an axially facing first side 46, an axially facing second side 47 facing in the opposite direction from that in which first side 46 faces, an inner surface 48 facing radially inwardly and extending between the first and second sides 46, 47, and an outer surface 50 facing radially outwardly and also extending between the first and second sides 46, 47. The first and second sides 46, 47 may be generally planar, in at least some implementations, and the clip 16 may conveniently be stamped from a sheet of suitable material. As shown in FIGS. 3, 5, and 6, when the clip 16 and the inner and outer shafts 12, 14 are assembled together, certain portions of the clip 16 (e.g., all or portions of the inner peripheral surface 48) are seated in the groove 18 in the inner shaft 12, and certain other portions of the clip 16 engage or radially overlap at least part of the axially-facing surface 20 of the outer shaft 14 (e.g., in the embodiment illustrated in FIG. 5, at least portions $52_1$, $52_2$, $52_3$ and $52_4$).

With continued reference to FIGS. 8 and 9, the clip 16 may further include a pair of ears 54 (i.e., $54_1$, $54_2$) that are configured to be engaged by a tool during the installation or assembly of the clip 16 with the inner and outer shafts 12, 14. The ears $54_1$, $54_2$ are disposed at respective free ends $44_1$, $44_2$ of the clip 16, and each extends a predetermined distance to the outer surface 50 in a radial direction and is disposed at a radial distance R from axis B. Each of ears $54_1$, $54_2$ also includes an inner face 56 (i.e., inner face $56_1$, in the case of ear $54_1$, and inner face $56_2$, in the case of ear $54_2$) that faces generally circumferential direction. In the illustrated embodiment, the inner faces $56_1$, $56_2$ face each other and may each be disposed at an angle such that the width of the opening 42 increases as it extends radially inward from the outer surface 50 toward the inner surface 48. As illustrated in FIGS. 8 and 9, when the faces $56_1$, $56_2$ are taken together, they form an acute included angle θ, which may have a magnitude falling within the range of 30°-50°, and that in one particular embodiment is about 39°; though it will be appreciated that other angle ranges and particular angles may also be suitable. Additionally, in an embodiment, the angles at which the inner faces $56_1$, $56_2$ are disposed are such that the faces $56_1$, $56_2$ are not parallel to each other when in either a first, relaxed state or in a second, maximum expansion state, which may be defined as a state in which the clip 16 is opened to a point at which it may freely move over the maximum outer diameter of the inner shaft 12. In other words, in at least some implementations, the faces $56_1$, $56_2$ are not parallel to each other before, during, or after the proper installation or assembly of the clip 16 with the inner and outer shafts 12, 14.

As illustrated in FIG. 8, in at least some implementations, the clip 16 has a generally elliptical shape that defines a first centerline 58 disposed within a horizontal plane 60 (extending into and out of the page as viewed in FIG. 8) when in a first, relaxed state. In this first state, the clip is not expanded (i.e. the ears are not pulled away from each other) or compressed (i.e. the ears are not pushed towards each other). When in the first state, certain portions of the inner peripheral surface 48 serve to define part of an imaginary circle 62 of a diameter D that, in turn, defines a second centerline 64 that is parallel to and offset from the first centerline 58 by a distance Z. As will be described in greater detail below, various dimensions of the clip 16 may be based, at least in part, on the diameter D of the circle 62 or the distance Z between the centerlines 58, 64.

As particularly shown in FIG. 8, the width of the clip 16 (e.g. distance between the inner and outer surfaces 48, 50) is not constant as the clip 16 extends from one ear 54 (or free end 44) to the other, but rather it varies. The clip 16 may include a plurality of sections or control zones 66. In an embodiment, all of the control zones 66 may have the same width W, while in other embodiments, one or more of the control zones 66 may have a width W and one or more other of the control zones 66 may have a width that is a certain amount greater than or less than W (e.g., up to +/−5%). In at least some implementations, the width of each of the control zones 66 remains constant throughout the zone. Further, one or more of the control zones 66 may comprise a line within a vertical plane, or alternatively one or more of the control zones 66 may have a certain circumferential length relative to the axis B of the clip 16. The clip 16 may further include a plurality of sections or intermediate zones 68 that have varying widths that may, at certain or all locations in that zone, be greater than and/or less than the width W, each of which may be disposed adjacent at least one of the control zones 66.

For example, in the embodiment illustrated in FIG. 8, the clip 16 includes a first control zone $66_1$ located at or near the closed end 40, a second control zone $66_2$ located between the first control zone $66_1$ and the first ear $54_1$, and a third control zone $66_3$ located between the first control zone $66_1$ and the second ear $54_2$. The clip 16 further includes a first intermediate zone $68_1$ extending between the first and second control zones $66_1$, $66_2$, and a second intermediate zone $68_2$ extending between the first and third control zones $66_1$, $66_3$. In the illustrated embodiment, the first and second intermediate zones $68_1$, $68_2$ are mirror images of each other and each progressively increases in width as it extends from the first control zone $66_1$ to a predetermined point (e.g., halfway point) between the first control zone $66_1$ and the second control zone $66_2$ (in the case of the first intermediate zone $68_1$) or between the first control zone $66_1$ and the third control zone $66_3$ (in the case of the second intermediate zone $68_2$). The width of each intermediate zone $68_1$, $68_2$ then progressively decreases as it extends from that predetermined point to either the second or third control $66_2$, $66_3$, respectively. In other words, the width of each intermediate zone $68_1$, $68_2$ increases from a width W at the first control zone $66_1$ (which, in an embodiment, is the minimum width of the clip 16 at the closed end 40) to a larger width, and then decreases to the width of the second or third control zone $66_2$, $66_3$, respectively, which may be the same width W as the first control zone $66_1$ or, alternatively, a width that is a certain amount greater than or less than W (e.g., up to +/−5%).

In the illustrated embodiment, the clip 16 further includes a third intermediate zone $68_3$ extending between the second control zone $66_2$ and the first ear $54_1$, and a fourth intermediate zone $68_4$ extending between the third control zone $66_3$ and the second ear $54_2$. In the illustrated embodiment, the third and fourth intermediate zones $68_3$, $68_4$ are mirror images of each other and each progressively decreases in width as it extends from the second control zone $66_2$ to the first ear $54_1$ (in the case of the third intermediate zone $68_3$), or from the third control zone $66_3$ to the second ear $54_2$ (in the case of the fourth intermediate zone $68_4$).

In at least some implementations, the control and intermediate zones of the clip 16 may be arranged in a manner that allows for a significant expansion of the clip 16 without yielding; stated differently, the zones are strategically located to control the yield stress on the clip. The arrangement of the zones also provides a number of locations or points distributed about the clip 16 at which the clip 16 may more readily flex when being expanded or opened. By way of example, in the particular embodiment depicted in FIG. 8, the first control zone $66_1$ is disposed within a vertical plane 70, which may also include a centerline 72 of the clip 16 that extends through both the center of the opening 42 in the open end 38 and the closed end 40, and that is orthogonal to the horizontal plane 60. The second control zone $66_2$ is disposed between the first control zone $66_1$ and the first ear $54_1$, and within the horizontal plane 60 that, as described above, includes the centerline 58 of the clip 16. Similarly, the third control zone $66_3$ is disposed between the first control zone $66_1$ and the second ear $54_2$, and may also be disposed within the horizontal plane 60.

While the embodiment of the clip 16 illustrated in FIG. 8 and described above includes three control zones 66 that each have the same constant width W and that are each disposed within one of the orthogonally arranged planes 60, 70, it will be appreciated that in other embodiments, the clip 16 may include more or less than three (3) of such control zones, the control zones may have different widths, and/or the control zones may be arranged in a different manner. More particularly, rather than each of the control zones being disposed within one of the orthogonally arranged planes 60, 70, one or more of the control zones may be offset from the vertical planes 60, 70 (e.g., within an angular range of the planes 60, 70). For example, in an embodiment such as that illustrated in FIG. 8, one or both of the control zones 66$_2$, 66$_3$ may be disposed within an angular range a of the horizontal plane 60 where, in at least some implementations, α is +/−15%. Similarly, while in the embodiment described above the clip 16 includes four intermediate zones 68 the widths of which vary in a variety of ways, it will be appreciated that in other embodiments the clip 16 may include more or less than four (4) of such intermediate zones, and/or the intermediate zones may have widths that vary in different ways than those described herein. Accordingly, the present disclosure is not limited to any particular number, types, or arrangements of control and/or intermediate zones.

Various dimensions of the clip 16, including some or all of those described above, may be dependent upon certain other dimensions of, or relating to, the clip 16. For example, various dimensions depicted in FIG. 8 may be based on or related to the diameter D of the circle 62 which, in turn, may be based on the magnitude of the outer diameter of the inner shaft 12 over which the clip 16 is passed during installation (e.g., D=90-95% of the outer diameter of the inner shaft 12, and in one particular embodiment, 93% of the outer diameter). More particularly, in an embodiment, though certainly not the only embodiment: the width W of control zones 66$_1$-66$_3$ may be approximately 6% of D; the radial distance R at which the radially-outermost portion of each of arms 54$_1$, 54$_2$ is disposed may be approximately 50-70% of D; the narrowest portion of the opening 42 at the open end 38 may have a width C that is approximately 45-65% (e.g., 56%) of D; and a maximum overall width of the clip 16 OW may be approximately 110-140% (e.g., 126%) of D. The offset Z between the centerline 58 of the clip 16 and the centerline 64 of the circle 62 defined by portions of the inner peripheral surface 48 of the clip 16 may be related to the magnitude of the width W of the control zones 66 (e.g., the offset Z may be approximately 25-45% of the width W), such that as the offset increases or decreases, the outer surface 50 increases or decreases accordingly (as do the maximum and minimum widths of the clip 16 in the intermediate portions or zones 68 adjacent the control zones 66, and the rate(s) at which the widths in those portions or zones change or vary). In implementations where the width of the control zones is fixed, as the magnitude of the offset Z increases, the intermediate zones 68$_3$ and 68$_4$ become thinner and the other intermediate zones 68$_1$ and 68$_2$ become wider. The opposite occurs as the magnitude of the offset Z decreases. Hence, in at least this way, the offset Z controls the width of the intermediate zones.

As will be appreciated in view of the above, the clip 16 is an elastically deformable clip that may be expanded or opened during assembly with the inner and outer shafts 12, 14 to allow for it to be passed over the outer diameter of the inner shaft 12, and that may then resiliently spring or snap into the groove 18 in the inner shaft 12. To that end, the clip 16 may be formed of an elastically deformable material such as, for example, certain types of steel (e.g., SAE 1095) or other suitable materials. In addition to being elastically deformable, the material may also have a particular hardness. For example, in an embodiment, the clip 16 is formed of SAE 1095 steel having a hardness of 485-530 Vickers; though it will be appreciated that other materials and/or hardness ranges may also be used.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. For example, the terms "control" and "intermediate" used to describe the zones of the clip are not intended to impart any limitations onto the construction or arrangement of those sections of the clip and have been used for expediency in describing the clip. An "intermediate zone" could extend to and include a free end of the clip. Furthermore, all stated values (e.g., percentages, angles, ranges, etc.) are provided for illustrative purposes only and are not meant to be limiting in nature. Those skilled in the art will appreciate that in some implementations that remain within the spirit and scope of the present invention, values other than those set forth herein may be used.

The invention claimed is:

1. A clip for restricting the axial movement of at least one of an inner shaft or an outer shaft relative to the other shaft, comprising:
   a first free end and a second free end;
   an opening between the first free end and the second free end, and defining an open end of the clip;
   a closed end opposite the open end;
   at least three control zones;
   a plurality of intermediate zones each having a varying width, and each being disposed adjacent to at least one of the at least three control zones; wherein the at least three control zones include a first control zone located in the closed end of the clip, a second control zone located between the first control zone and the first free end, and a third control zone located between the first control zone and the second free end, and wherein the plurality of intermediate zones includes a first intermediate zone disposed between the first and second control zones, and the width of the first intermediate zone progressively increases and then progressively decreases as the first intermediate zone extends between the first and second control zones, and a second intermediate zone disposed between the first and third control zones, and the width of the second intermediate zone progressively increases and then progressively decreases as the second intermediate zone extends between the first and third control zones, and a third intermediate zone disposed between the second control zone and the first free end, and a fourth intermediate zone disposed between the third control zone and the second free end, and wherein the width of the third intermediate zone decreases as it extends from the second control zone to the first free end, and the width of the fourth intermediate zone decreases as it extends from the third control zone to the second free end.

2. The clip of claim 1, wherein the widths of the first and second intermediate zones increase from the width of the first control zone and then decrease to the width of the second or third control zone, respectively.

3. The clip of claim 2, wherein the width of the first control zone is the same as the width of the second control zone, the third control zone, or both.

4. The clip of claim 2, wherein the width of first control zone is different than the width of the second control zone, the third control zone, or both.

5. The clip of claim 4, wherein the widths of the second and third control zones are within 5% of the width of the first control zone.

6. The clip of claim 1, wherein the first control zone is disposed within a first vertical plane that includes a centerline of the clip extending through the closed end and the center of the open end, and at least one of the second or third control zones is disposed within a predetermined angular range of a second plane that is orthogonal to the first vertical plane.

7. The clip of claim 6, wherein the second plane includes a centerline of the clip that is orthogonal to the centerline extending through the closed end and the center of the open end.

8. The clip of claim 1, wherein the clip is generally elliptical in shape.

9. The clip of claim 1, wherein the opening at the open end of the clip has a width that increases as it extends radially inward.

10. The clip of claim 1, further comprising an inner peripheral surface having portions that define a circle, wherein the opening at the open end of the clip has a width that is 45-65% of the diameter of the circle.

11. The clip of claim 1, further comprising an inner peripheral surface having portions that define a circle, wherein the width of the control zones is between 4% and 8% of the diameter of the circle.

12. The clip of claim 1, further comprising an inner peripheral surface having portions that define a circle, wherein a maximum overall width of the clip is approximately 110-140% of the diameter of the circle.

13. The clip of claim 1, further comprising an inner peripheral surface having portions that define a circle, wherein an offset between a centerline of the clip and the centerline of the circle is approximately 25-45% of the width of the control zones.

14. An assembly, comprising:
an inner shaft defining a longitudinal axis and having a groove formed in an outer surface thereof;
a member having an axially facing surface relative to the longitudinal axis;
an elastically deformable clip including an open end having an opening and a closed end opposite the open end, wherein when the clip is assembled with the inner shaft and the member, respective portions of the clip are seated within the groove of the inner shaft and engage the axially-facing surface of the member, and the clip is operative to restrict axial movement of at least one of the inner shaft or member relative to each other; and
a component having a bore within which the inner shaft, member, and clip are disposed, the component including a raised portion that extends into the bore such that at least a portion of the bore has a non-circular cross-sectional shape, wherein
the clip is configured to be elastically deformed to pass over the raised portion in the bore during the assembly of the clip with the inner shaft and member without yielding and wherein the clip includes at least three control zones; and a plurality of intermediate zones each having a varying width, and each being disposed adjacent to at least one of the at least three control zones, wherein the at least three control zones include a first control zone located in the closed end of the clip, a second control zone located between the first control zone and the first free end, and a third control zone located between the first control zone and the second free end, and wherein the plurality of intermediate zones includes a first intermediate zone disposed between the first and second control zones which has a width that progressively increases and then progressively decreases as the first intermediate zone extends between the first and second control zones, and a second intermediate zone disposed between the first and third control zones which has a width that progressively increases and then progressively decreases as the second intermediate zone extends between the first and third control zones.

15. The system of claim 14, wherein the widths of the first and second intermediate zone increase from the width of the first control zone and then decrease to the width of the second or third control zone, respectively.

16. The clip of claim 15, wherein the width of the first control zone is the same as the width of the second control zone, the third control zone, or both.

17. The clip of claim 14, further comprising an inner peripheral surface having portions that define a circle, wherein the opening at the open end of the clip has a width that is 45-65% of the diameter of the circle.

18. The clip of claim 14, further comprising an inner peripheral surface having portions that define a circle, wherein an offset between the centerline of the clip and the centerline of the circle is approximately 25-45% of the width of the control zones.

* * * * *